(12) United States Patent
Kim et al.

(10) Patent No.: US 7,116,383 B2
(45) Date of Patent: Oct. 3, 2006

(54) ARRAY SUBSTRATE FOR LIQUID CRYSTAL DISPLAY DEVICE AND FABRICATING METHOD THEREOF

(75) Inventors: Woong-Kwon Kim, Kyonggi-do (KR); Youn-Gyoung Chang, Kyonggi-do (KR)

(73) Assignee: LG Philips LCD Co., Ltd., Seoul (KR)

( * ) Notice: Subject to any disclaimer, the term of this patent is extended or adjusted under 35 U.S.C. 154(b) by 55 days.

(21) Appl. No.: 10/202,386

(22) Filed: Jul. 25, 2002

(65) Prior Publication Data
US 2003/0020847 A1  Jan. 30, 2003

(30) Foreign Application Priority Data
Jul. 25, 2001  (KR) ................ 2001-44758

(51) Int. Cl.
G02F 1/138 (2006.01)
G02F 1/1333 (2006.01)

(52) U.S. Cl. ........................ 349/44; 349/111
(58) Field of Classification Search ............. 349/42, 349/43, 44, 111
See application file for complete search history.

(56) References Cited

U.S. PATENT DOCUMENTS 6,380,559 B1 * 4/2002 Park et al. ............... 257/59
6,468,822 B1 * 10/2002 Maeda et al. ............ 438/30

* cited by examiner

*Primary Examiner*—James A. Dudek
(74) *Attorney, Agent, or Firm*—McKenna Long & Aldridge LLP

(57) ABSTRACT

An array substrate for a liquid crystal display device includes a substrate, a gate line on the substrate, the gate line connected to a gate pad, a data line on the substrate, the data line connected to a data pad and crossing the gate line for defining a pixel region, a thin film transistor connected to the gate line and the data line, the thin film having a gate electrode and source and drain electrodes, a passivation layer having a first contact hole exposing the drain electrode, a second contact hole exposing the gate pad, and a third contact hole exposing the data pad, a black matrix on the passivation layer, a first conductive pattern covering the first contact hole, a pixel electrode on the passivation layer at the pixel region, the pixel electrode contacting the first conductive pattern, an auxiliary gate pad connected to the gate pad through the second contact hole, and an auxiliary data pad connected to the data pad through the third contact hole.

20 Claims, 7 Drawing Sheets

ARRAY SUBSTRATE FOR LIQUID CRYSTAL DISPLAY DEVICE AND FABRICATING METHOD THEREOF

This application claims the benefit of the Korean Patent Application No. P2001-44758 filed on Jul. 25, 2001, which is hereby incorporated by reference.

BACKGROUND OF THE INVENTION

1. Field of the Invention

The present invention relates to a liquid crystal display, and more particularly, to an array substrate for a liquid crystal display device and a fabricating method thereof. Although the present invention is suitable for a wide scope of applications, it is particularly suitable for preventing a photocurrent generation and a signal delay in the liquid crystal display device.

2. Discussion of the Related Art

Flat panel display (FPD) devices having small size, light-weight, and low power consumption may have been a subject of recent research in the advent of the information age. Among many kinds of FPD devices, liquid crystal display (LCD) devices have been widely developed and used because of their excellent characteristics in resolution, color display, and display quality.

Generally, LCD devices include an upper substrate and a lower substrate facing into each other with liquid crystal molecules interposed therebetween. Each substrate has an electrode on the inner surface thereof. An electric field is generated by applying a voltage to the electrodes, thereby driving the liquid crystal molecules to display images in accordance with the light transmittance.

The lower substrate is referred to as an array substrate including a thin film transistor (TFT) that is formed through repeated deposition of thin films, photolithography, and an etch process. The upper substrate is referred to as a color filter substrate including a color filter layer that is formed through a dyeing method, a printing method, a pigment dispersion method, or an electro-deposition method. Three colors of red (R), green (G), and blue (B) are alternately disposed in the color filter layer.

FIG. 1 is a cross-sectional view of a conventional LCD device.

In FIG. 1, a gate electrode 12 of a conductive material such as metal is formed on a first substrate 11. A gate insulating layer 13 of silicon nitride (SiNx) or silicon oxide ($SiO_2$) is formed on the gate electrode 12. An active layer 14 of amorphous silicon is formed on the gate insulating layer 13 over the gate electrode 12. An ohmic contact layer 15a and 15b of doped amorphous silicon is formed on the active layer 14. Source and drain electrodes 16a and 16b of a conductive material such as metal are formed on the ohmic contact layer 15a and 15b. The source and drain electrodes 16a and 16b form a TFT "T" with the gate electrode 12. The gate electrode 12 and the source electrode 16a are connected to a gate line (not shown) and a data line (not shown), respectively. The gate line and the data line cross each other and define a pixel region. A passivation layer 17 of SiNx, $SiO_2$, or an organic insulating material is formed on the source and drain electrodes 16a and 16b. The passivation layer 17 includes a contact hole 17c exposing the drain electrode 16b. A pixel electrode 18 of a transparent conductive material is formed on the passivation layer 17 and connected to the drain electrode 16b through the contact hole 17c.

A second substrate 21 is disposed over and spaced apart from the first substrate 11. A black matrix 22 corresponding to the TFT "T" is formed beneath the second substrate 21. The black matrix 22 has an open portion (not shown) corresponding to the pixel electrode 18. The black matrix 22 prevents a light leakage at an LCD panel except for the pixel electrode 18 and a photocurrent generated by screening a channel of the TFT "T" from the ambient light. The black matrix 22 is formed in a color filter layer 23a and 23b. The color filter layer 23a and 23b having three colors of R, G, and B is alternately disposed. The color filter layer corresponds to the pixel region. A common electrode 24 of a transparent conductive material is formed beneath the color filter layer 23a and 23b. A liquid crystal layer 30 is interposed between the pixel electrode 18 and the common electrode 24.

The black matrix may prevent light from being leaked at an LCD panel except for the pixel electrode and photocurrent from being generated by screening a channel of the TFT from the ambient light. However, since the black matrix is spaced apart from the TFT, the black matrix does not shield the oblique incident light or a portion of the light reflected at the black matrix. Therefore, such light reaches the channel of the TFT, thereby generating a photocurrent. Moreover, the TFT becomes non-uniform in characteristics.

On the other hand, as LCD devices have larger size and higher resolution, a signal line becomes longer and narrower. Accordingly, a possibility of the signal delay increases. To reduce resistance of the signal line, a material of low resistivity such as aluminum (Al) or copper (Cu) is used for the signal line. Generally, a pixel electrode is formed of a transparent conductive material such as indium-tin-oxide (ITO). A contact resistance between ITO and Al is relatively high, and Cu is susceptible to an ITO etchant. Therefore, when Al or Cu is used for the signal line, an electrical short-circuit may occur at the contact portion between ITO and Al. Moreover, a signal may be distorted.

SUMMARY OF THE INVENTION

Accordingly, the present invention is directed to an array substrate for a liquid crystal display device and a fabricating method thereof that substantially obviates one or more of problems due to limitations and disadvantages of the related art.

An object of the present invention is to provide an array substrate for a liquid crystal display device and a fabricating method thereof, in which photocurrent generation is effectively prevented.

Another object of the present invention is to provide an array substrate for a liquid crystal display device and a fabricating method thereof, in which a line damage is prevented without increase of process steps.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device includes a substrate, a gate line on the substrate, the gate line connected to a gate pad, a data line on the substrate, the data line connected to a data pad and crossing the gate line for defining a pixel region, a thin film transistor connected to the gate line and the data line, the thin film transistor having a gate electrode and source and drain electrodes, a passivation layer over the gate line, the data line, and the thin film transistor, the passivation layer having a first contact hole exposing the drain electrode, a second contact hole exposing the gate pad, and a third contact hole exposing the data pad, a black matrix on the passivation layer over the thin film transistor, a first conductive pattern covering the first contact hole, a pixel electrode on the passivation layer at the pixel region, the pixel electrode contacting the first conductive pattern, an auxiliary gate pad connected to the gate pad through the second contact hole, and an auxiliary data pad connected to the data pad through the third contact hole.

In another aspect of the present invention, a fabricating method of an array substrate for a liquid crystal display device includes forming a gate line on a substrate to connect to a gate pad, forming a data line on the substrate to connect to a data pad and to cross the gate line to define a pixel region, forming a thin film transistor connected to the gate line and the data line, the thin film transistor having a gate electrode and source and drain electrodes, forming a passivation layer over the gate line, the data line, and the thin film transistor, the passivation layer having a first contact hole exposing the drain electrode, a second contact hole exposing the gate pad, and a third contact hole exposing the data pad, simultaneously forming a black matrix and a first conductive pattern on the passivation layer, wherein the black matrix is formed over the thin film transistor, and the first conductive pattern covers the first contact hole, and simultaneously forming a pixel electrode, an auxiliary gate pad and an auxiliary data pad on the passivation layer, wherein the pixel electrode contacts the first conductive pattern at the pixel region, the auxiliary gate pad is connected to the gate pad through the second contact hole, and the auxiliary data pad connected to the data pad through the third contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
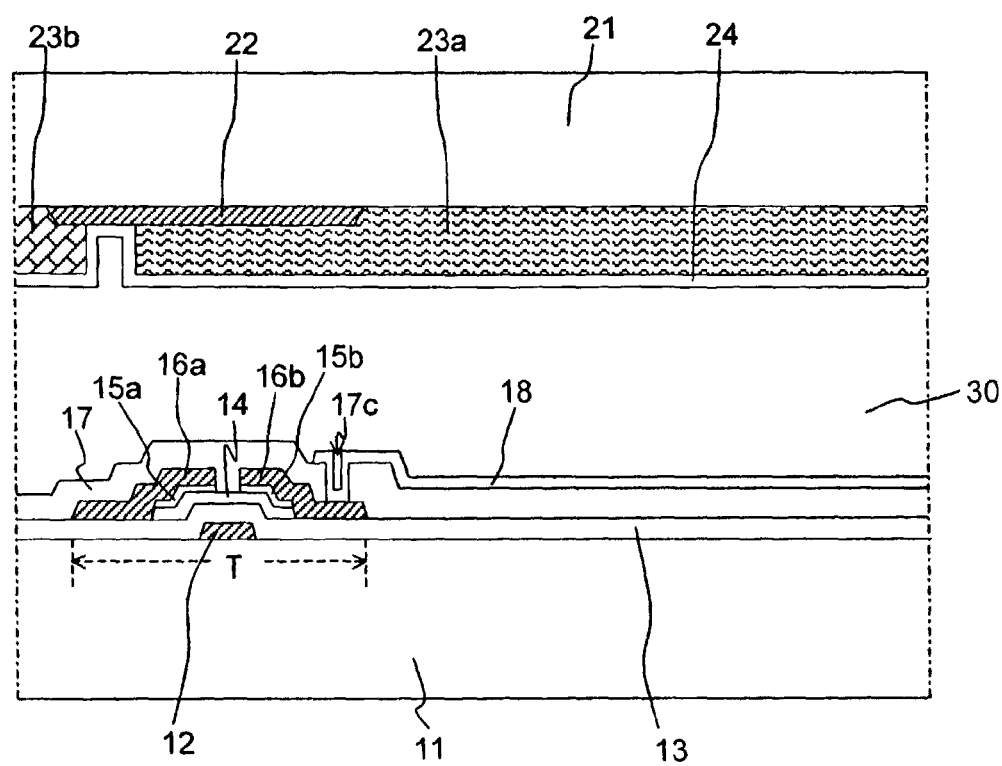
FIG. 1 is a cross-sectional view of a conventional LCD device.
Figure 2:
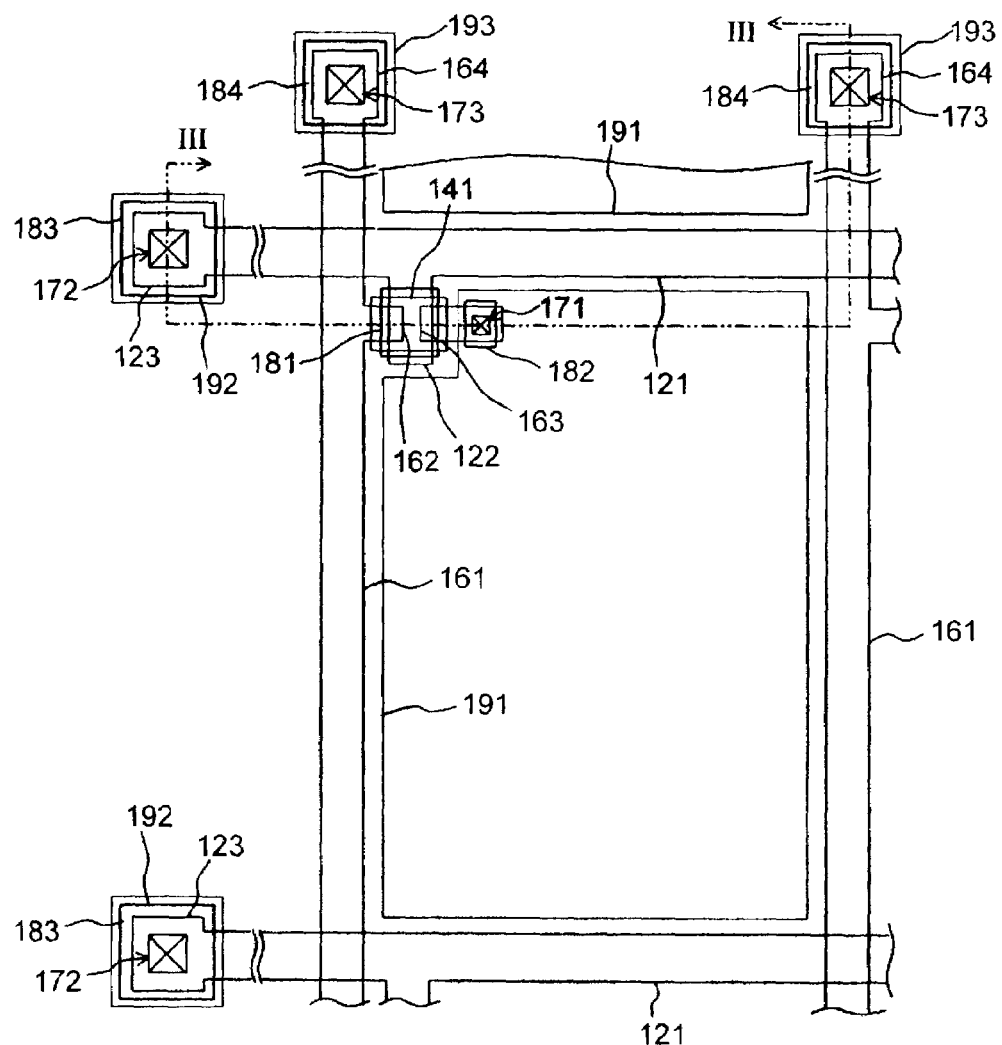
FIG. 2 is a schematic plan view of an array substrate for a liquid crystal display device according to a first embodiment of the present invention.
Figure 3:
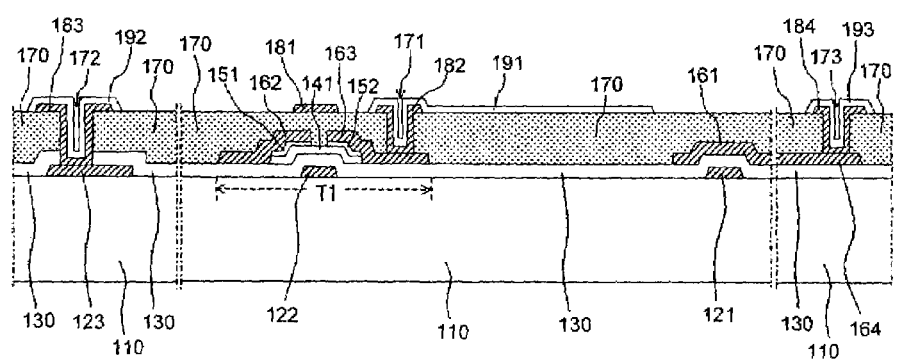
FIG. 3 is a schematic cross-sectional view taken along the line III—III of FIG. 2.

FIG. 2 is a schematic plan view of an array substrate for a liquid crystal display device according to a first embodiment of the present invention and FIG. 3 is a schematic cross-sectional view taken along the line III—III of FIG. 2.

In FIGS. 2 and 3, a gate line 121 of a conductive material such as metal is formed on a substrate 110 along a first direction. A gate electrode 122 is extended from the gate line 121, and a gate pad 123 is formed at one end of the gate line 121. A gate insulating layer 130 of silicon nitride (SiNx) or silicon oxide ($SiO_2$) is formed on the gate line 121, the gate electrode 122, and the gate pad 123.

An active layer 141 of amorphous silicon is formed on the gate insulating layer 130 over the gate electrode 122. An ohmic contact layer 151 and 152 of impurity-doped amorphous silicon is formed on the active layer 141. Source and drain electrodes 162 and 163 are formed on the ohmic contact layer 151 and 152. The source and drain electrodes 162 and 163 face into each other by regarding the gate electrode 122 as the center.

The gate electrode 122, the source and drain electrodes 162 and 163 form a thin film transistor (TFT) "T1". A data line 161 of a conductive material such as metal is formed on the gate insulating layer 130. The data line 161 crosses the gate line 121 and defines a pixel region with the gate line 121. The source electrode 162 is connected to the data line 161. A data pad 164 is formed at one end of the data line 161. The gate line 121 and the data line 161 are formed of one of Al, Al alloy, Cu, and Cu alloy which have a low resistance to prevent a signal delay.

A passivation layer 170 having first, second, and third contact holes 171, 172, and 173 is formed on the data line 161, the data pad 164 and the source and drain electrodes 162 and 163. The first, second, and third contact holes 171, 172, and 173 expose portions of the drain electrode 163, the gate pad 123, and the data pad 164, respectively. Here, the gate insulating layer 130 and the passivation layer 170 have the second contact hole 172 in common. A black matrix 181, first, second, and third conductive patterns 182, 183, and 184 formed of one of chromium (Cr), molybdenum (Mo), and titanium (Ti) are formed on the passivation layer 170. The black matrix 181 over the TFT "T1" prevents light from entering a channel of the TFT The first conductive pattern 182 contacts the drain electrode 163 through the first contact hole 171. The second conductive pattern 183 contacts the gate pad 123 through the second contact hole 172, and the third conductive pattern 184 contacts the data pad 164 through the third contact hole 173. A pixel electrode 191 of a transparent conductive material such as ITO or indium-zinc-oxide (IZO) is formed on the passivation layer 170. An auxiliary gate pad 192 and an auxiliary data pad 193 are formed on the second and third conductive patterns 183 and 184, respectively. The pixel electrode 191 is connected to the first conductive pattern 182 and a signal is applied to the pixel electrode 191 through the drain electrode 163 of the TFT "T1".

In the first embodiment of the present invention, since the black matrix of a conductive material is formed over the TFT, the TFT is shielded from the incident light so that a generation of photocurrent is prevented. Moreover, a signal delay is prevented by using a low resistive material, for example, Al or Cu as the gate line and the data line. A contact characteristic is improved and an electrical short-circuit is prevented by forming a conductive pattern between an upper ITO and a drain electrode, between an upper ITO and a gate pad, and between an upper ITO and a data pad.

FIGS. 4A to 4F are schematic cross-sectional views showing a fabricating process of an array substrate for a liquid crystal display device according to a first embodiment of the present invention. FIGS. 4A to 4F are cross-sectional views also taken along the line III—III of FIG. 2.

Figure 4A:
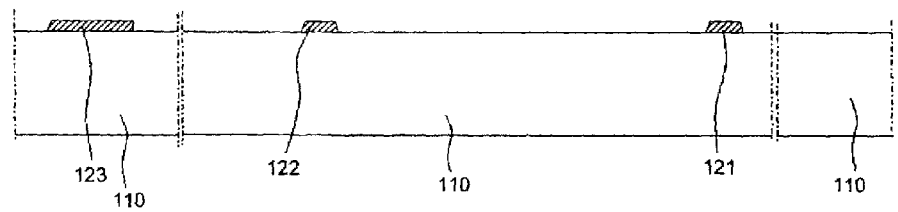
FIGS. 4A to 4F are schematic cross-sectional views showing a fabricating process of an array substrate for an liquid crystal display device according to the first embodiment of the present invention.

In FIG. 4A, a gate line 121, a gate electrode 122, and a gate pad 123 formed of one of Al, Al alloy, Cu, and Cu alloy are formed on a substrate 110.

Figure 4B:
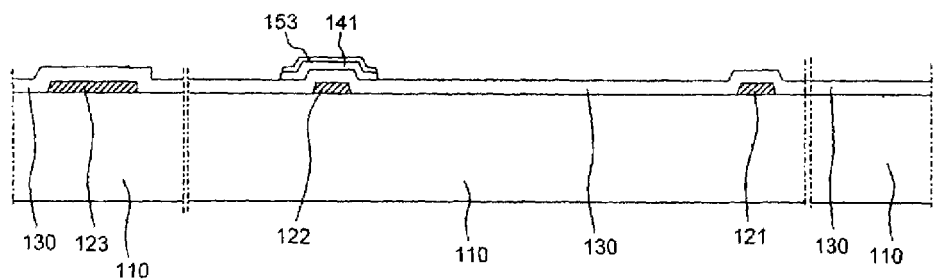

In FIG. 4B, after sequentially depositing a gate insulating layer 130, amorphous silicon and impurity-doped amorphous silicon, an active layer 141, and a doped semiconductor layer 153 are formed over the gate electrode 122 by patterning.

Figure 4C:
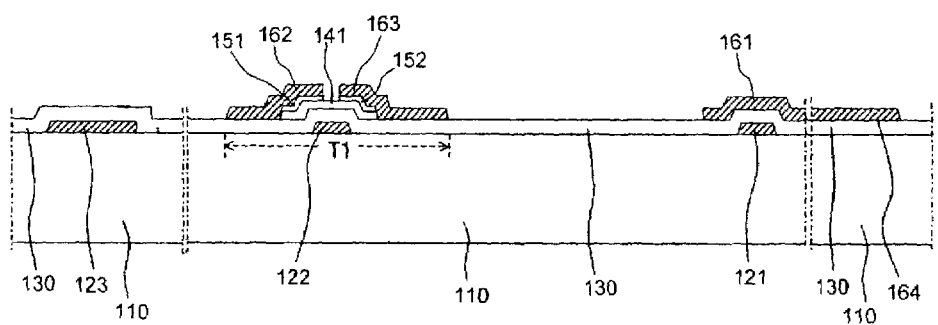

In FIG. 4C, a data line 161, a data pad 164, source and drain electrodes 162 and 163 are formed on the gate insulating layer 130 through depositing and patterning one of Al, Al alloy, Cu, and Cu alloy. After etching the doped semiconductor layer 153 between the source and drain electrodes 162 and 163, an ohmic contact layer 151 and 152 is completed thereon.

Figure 4D:
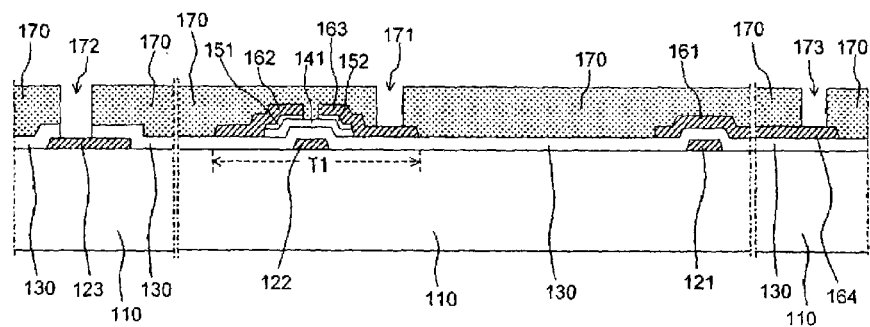

In FIG. 4D, a passivation layer 170 having first, second, and third contact holes 171, 172, and 173 is formed through depositing and patterning an insulating material of a low permittivity, such as benzocyclobutene (BCB) and acrylic organic material. The first, second, and third contact holes 171, 172, and 173 expose portions of the drain electrode 163, the gate pad 123, and the data pad 164, respectively.

Figure 4E:
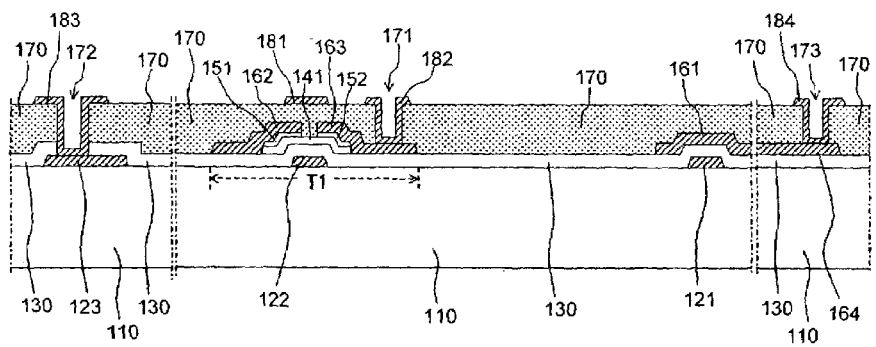

In FIG. 4E, a black matrix 181, first, second, and third conductive patterns 182, 183, and 184 are formed on the passivation layer 170 through depositing and patterning a conductive material such as metal. The black matrix is disposed over the TFT "T1". The first, second, and third conductive patterns 182, 183, and 184 cover at least the inside walls of the first, second, and third contact holes 171, 172, and 173, respectively. The black matrix 181 and the first, second, and third conductive patterns 182, 183, and 184 are formed of one of Cr, Mo, and Ti, which have a low contact resistance to ITO and stand ITO etchant well.

Figure 4F:
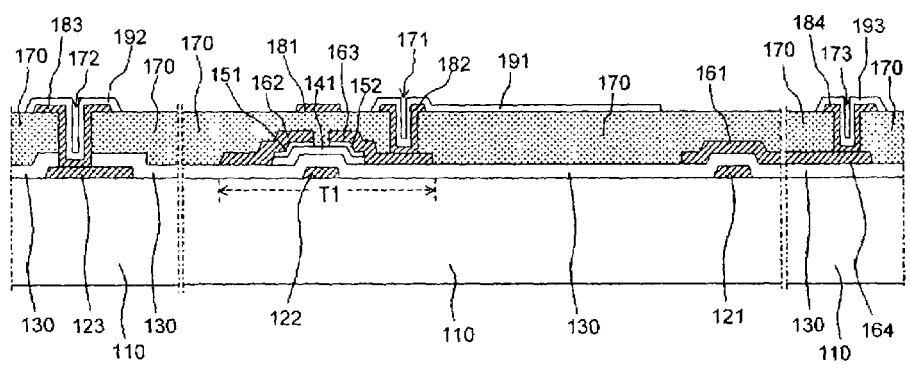

In FIG. 4F, a pixel electrode 191, an auxiliary gate pad 192, and an auxiliary data pad 193 are formed through depositing and patterning a transparent conductive material such as ITO, IZO, and indium-tin-zinc-oxide (ITZO). The pixel electrode 191 contacts the first conductive pattern 182. The auxiliary gate pad 192 is connected to the gate pad 123 through the second conductive pattern 183, and the auxiliary data pad 193 is connected to the data pad 164 through the third conductive pattern 184.

When the black matrix is formed over the TFT in the first embodiment of the present invention, the conductive patterns of the same material as the black matrix are formed on the drain electrode, the gate pad, and the data pad of a low resistance. Therefore, a contact resistance to ITO is reduced without increase in the number of processes, and damages such as an electrical short-circuit are prevented. Even though all contact portions between ITO and line of low resistance have conductive patterns, not all contact portions have the conductive patterns. That is, the conductive pattern can be formed only on the gate pad or only on the data pad. Furthermore, a TFT characteristic is improved through connecting the black matrix and the pixel electrode, and applying a voltage to the black matrix.

Figure 5:
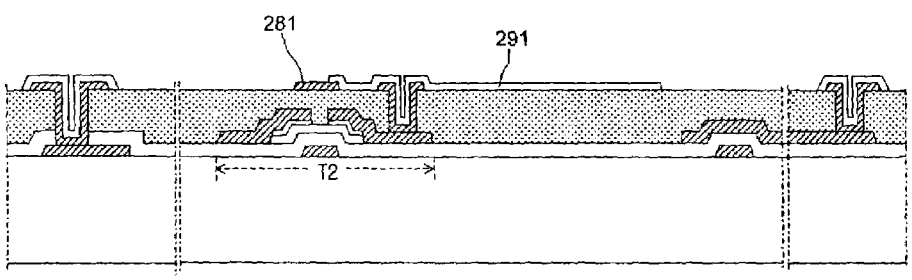
FIG. 5 is a schematic cross-sectional view of an array substrate for a liquid crystal display device according to a second embodiment of the present invention.

FIG. 5 is a schematic cross-sectional view of an array substrate for a liquid crystal display device according to a second embodiment of the present invention. Since the second embodiment is the same as the first embodiment except for a black matrix and a pixel electrode, illustrations for the same portion will be omitted.

In FIG. 5, a black matrix 281 over a TFT "T2" contacts a pixel electrode 291. As a result, a voltage of the pixel electrode 291 is applied to the black matrix 281 and charges of back channel of the TFT "T2" may be controlled. Therefore, the TFT "T2" has the same effect as a dual gate TFT which includes two gate electrodes.

Figure 6:
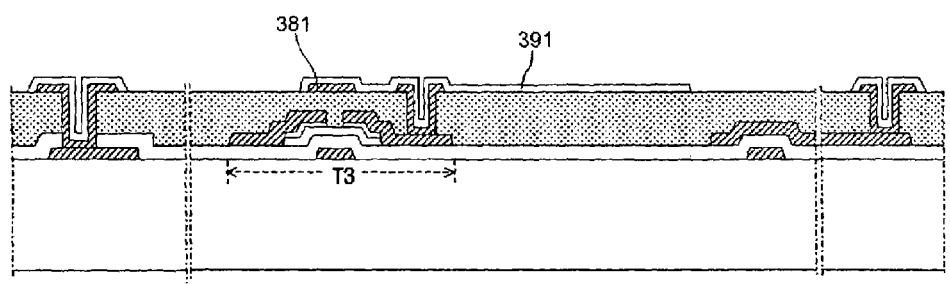
FIG. 6 is a schematic cross-sectional view of an array substrate for a liquid crystal display device according to a third embodiment of the present invention.

FIG. 6 is a schematic cross-sectional view of an array substrate for a liquid crystal display device according to a third embodiment of the present invention. Since the third embodiment is the same as the first embodiment except for a black matrix and a pixel electrode, illustrations for the same portion will be omitted.

In FIG. 6, a pixel electrode 391 covers a black matrix 381 over a TFT "T3". As a result, the array substrate has not only the same effect as a dual gate TFT but also an effect that the black matrix 381 is protected.

Consequently, since the black matrix is formed over the TFT of the array substrate, a photocurrent generation may be prevented. In addition, a signal delay is reduced through forming the gate line and the data line with a low resistive material. Moreover, since the conductive patterns of the same material as the black matrix are formed on the drain electrode, the gate pad, and the data pad, a contact resistance to ITO is reduced without increase in the number of processes, and damages such as an electrical short-circuit are prevented. On the other hand, a TFT characteristic may be improved through connecting a black matrix and a pixel electrode, and applying a voltage to a black matrix.

It will be apparent to those skilled in the art that various modifications and variations can be made in the liquid crystal display device and the fabricating method thereof of the present invention without departing from the spirit or scope of the inventions. Thus, it is intended that the present invention covers the modifications and variations of this invention provided they come within the scope of the appended claims and their equivalents.

What is claimed is:

1. An array substrate for a liquid crystal display device, comprising:
    a substrate;
    a gate line on the substrate, the gate line connected to a gate pad;
    a data line on the substrate, the data line connected to a data pad and crossing the gate line for defining a pixel region;
    a thin film transistor connected to the gate line and the data line, the thin film transistor having a gate electrode and source and drain electrodes;
    a passivation layer over the gate line, the data line, and the thin film transistor, the passivation layer having a first contact hole exposing the drain electrode, a second contact hole exposing the gate pad, and a third contact hole exposing the data pad;
    a black matrix on the passivation layer over the thin film transistor;
    a first conductive pattern covering the first contact hole, wherein the first conductive pattern is formed of the same material as the black matrix, and wherein the first conductive pattern is formed in the same layer as the black matrix;

a pixel electrode on a surface of the passivation layer at the pixel region, the pixel electrode contacting the first conductive pattern;

an auxiliary gate pad connected to the gate pad through the second contact hole; and an auxiliary data pad connected to the data pad through the third contact hole.

2. The substrate according to claim 1, wherein the gate line and the data line are formed of one of aluminum, aluminum alloy, copper, and copper alloy.

3. The substrate according to claim 1, wherein the pixel electrode is formed of one of indium-tin-oxide and indium-zinc-oxide.

4. The substrate according to claim 1, wherein the black matrix is formed of one of chromium, molybdenum, and titanium.

5. The substrate according to claim 1, further comprising a second conductive pattern interposed between the gate pad and the auxiliary gate pad.

6. The substrate according to claim 5, wherein the second conductive pattern is formed of the same material as the black matrix.

7. The substrate according to claim 1, further comprising a third conductive pattern interposed between the data pad and the auxiliary data pad.

8. The substrate according to claim 7, wherein the third conductive pattern is formed of the same material as the black matrix.

9. The substrate according to claim 5, further comprising a third conductive pattern interposed between the data pad and the auxiliary data pad.

10. The substrate according to claim 9, wherein the third conductive pattern is formed of the same material as the black matrix.

11. The substrate according to claim 1, wherein at least a portion of the black matrix is covered with the pixel electrode.

12. The substrate according to claim 11, wherein the black matrix is fully covered with the pixel electrode.

13. The substrate according to claim 1, wherein the auxiliary gate pad is formed of the same material as the pixel electrode.

14. The substrate according to claim 1, wherein the auxiliary data pad is formed of the same material as the pixel electrode.

15. A fabricating method of an array substrate for a liquid crystal display device, comprising:

forming a gate line on a substrate to connect to a gate pad;

forming a data line on the substrate to connect to a data pad and to cross the gate line to define a pixel region;

forming a thin film transistor connected to the gate line and the data line, the thin film transistor having a gate electrode and source and drain electrodes;

forming a passivation layer over the gate line, the data line, and the thin film transistor, the passivation layer having a first contact hole exposing the drain electrode, a second contact hole exposing the gate pad, and a third contact hole exposing the data pad;

simultaneously forming a black matrix and a first conductive pattern on the passivation layer, wherein the black matrix is formed over the thin film transistor, and the first conductive pattern covers the first contact hole; and simultaneously forming a pixel electrode, an auxiliary gate pad and an auxiliary data pad on a surface of the passivation layer, wherein the pixel electrode contacts the first conductive pattern at the pixel region, the auxiliary gate pad is connected to the gate pad through the second contact hole, and the auxiliary data pad is connected to the data pad through the third contact hole.

16. The method according to claim 15, wherein the gate line and the data line is formed of one of aluminum, aluminum alloy, copper, and copper alloy.

17. The method according to claim 15, wherein the pixel electrode is formed of one of indium-tin-oxide and indium-zinc-oxide.

18. The method according to claim 15, wherein the black matrix is formed of one of chromium, molybdenum, and titanium.

19. The method according to claim 15, wherein a second conductive pattern is simultaneously formed with the black matrix and the first conduct pattern between the gate pad and the auxiliary gate pad.

20. The method according to claim 15, wherein a third conductive pattern is simultaneously formed with the black matrix and the first conductive pattern between the data pad and the auxiliary data pad.

* * * * *